United States Patent
Levy et al.

(10) Patent No.: US 6,317,804 B1
(45) Date of Patent: Nov. 13, 2001

(54) CONCURRENT SERIAL INTERCONNECT FOR INTEGRATING FUNCTIONAL BLOCKS IN AN INTEGRATED CIRCUIT DEVICE

(75) Inventors: Paul S. Levy, Chandler; Judson Alan Lehman, Scottsdale, both of AZ (US)

(73) Assignee: Philips Semiconductors Inc., New York, NY (US)

( * ) Notice: Subject to any disclaimer, the term of this patent is extended or adjusted under 35 U.S.C. 154(b) by 0 days.

(21) Appl. No.: 09/201,450

(22) Filed: Nov. 30, 1998

(51) Int. Cl.[7] .............................. G06F 13/00; G06F 13/14
(52) U.S. Cl. ............................................. 710/129; 710/126
(58) Field of Search ................................... 710/129–132, 710/38; 709/252–253; 370/360–385, 498–545

(56) References Cited

U.S. PATENT DOCUMENTS

| | | | |
|---|---|---|---|
| 5,068,823 | 11/1991 | Robinson | 395/500 |
| 5,151,623 | 9/1992 | Agrawal | 307/465 |
| 5,189,665 * | 2/1993 | Niehaus et al. | 370/248 |
| 5,261,059 * | 11/1993 | Hedberg et al. | 710/132 |
| 5,311,459 | 5/1994 | D'Luna et al. | 364/754 |
| 5,428,750 * | 6/1995 | Hsieh et al. | 710/129 |
| 5,430,442 * | 7/1995 | Kaiser et al. | 340/825.79 |
| 5,469,545 | 11/1995 | Vanbuskirk et al. | 395/200.01 |
| 5,513,369 | 4/1996 | Patel et al. | 395/800 |
| 5,537,583 * | 7/1996 | Truong | 713/500 |
| 5,555,540 * | 9/1996 | Radke | 370/462 |
| 5,555,543 * | 9/1996 | Grohoski et al. | 709/209 |
| 5,604,735 * | 2/1997 | Levinson et al. | 370/360 |
| 5,655,142 | 8/1997 | Gephardt et al. | 395/800.32 |
| 5,680,402 * | 10/1997 | Olnowich et al. | 370/498 |
| 5,754,828 * | 5/1998 | Adan et al. | 395/500 |
| 5,838,937 * | 11/1998 | Lee et al. | 710/131 |
| 5,870,310 | 2/1999 | Malladi | 364/490 |
| 6,035,345 * | 3/2000 | Lee | 710/8 |
| 6,035,414 * | 3/2000 | Okazawa et al. | 714/7 |
| 6,041,400 | 3/2000 | Ozcelik et al. | 712/35 |
| 6,094,436 * | 7/2000 | Runaldue et al. | 370/420 |
| 6,112,241 * | 8/2000 | Abdelnour et al. | 709/224 |
| 6,138,185 * | 10/2000 | Nelson et al. | 710/33 |
| 6,145,024 * | 11/2000 | Maezawa et al. | 710/14 |

FOREIGN PATENT DOCUMENTS 0 308 890 A2   3/1989   (EP) .
0 653 896 A2   5/1995   (EP) .

* cited by examiner

Primary Examiner—Sumati Lefkowitz
(74) Attorney, Agent, or Firm—Wood, Herron & Evans, L.L.P.

(57) ABSTRACT

A circuit arrangement and method interface multiple functional blocks within an integrated circuit device via a concurrent serial interconnect capable of routing separate serial command, data and clock signals between functional blocks in the device. The concurrent serial interconnect utilizes a plurality of serial ports that are selectively coupled to one another by an interface controller to define one or more logical communication channels between two or more of the serial ports. Each serial port is coupled via a point-to-point interconnection with a port interface in a functional block. In addition, the concurrent serial interconnect facilitates the design of an integrated circuit device by supporting the addition of a serial interconnect to an assemblage of functional blocks, with each functional block associated with one of a plurality of serial ports in the serial interconnect.

40 Claims, 9 Drawing Sheets

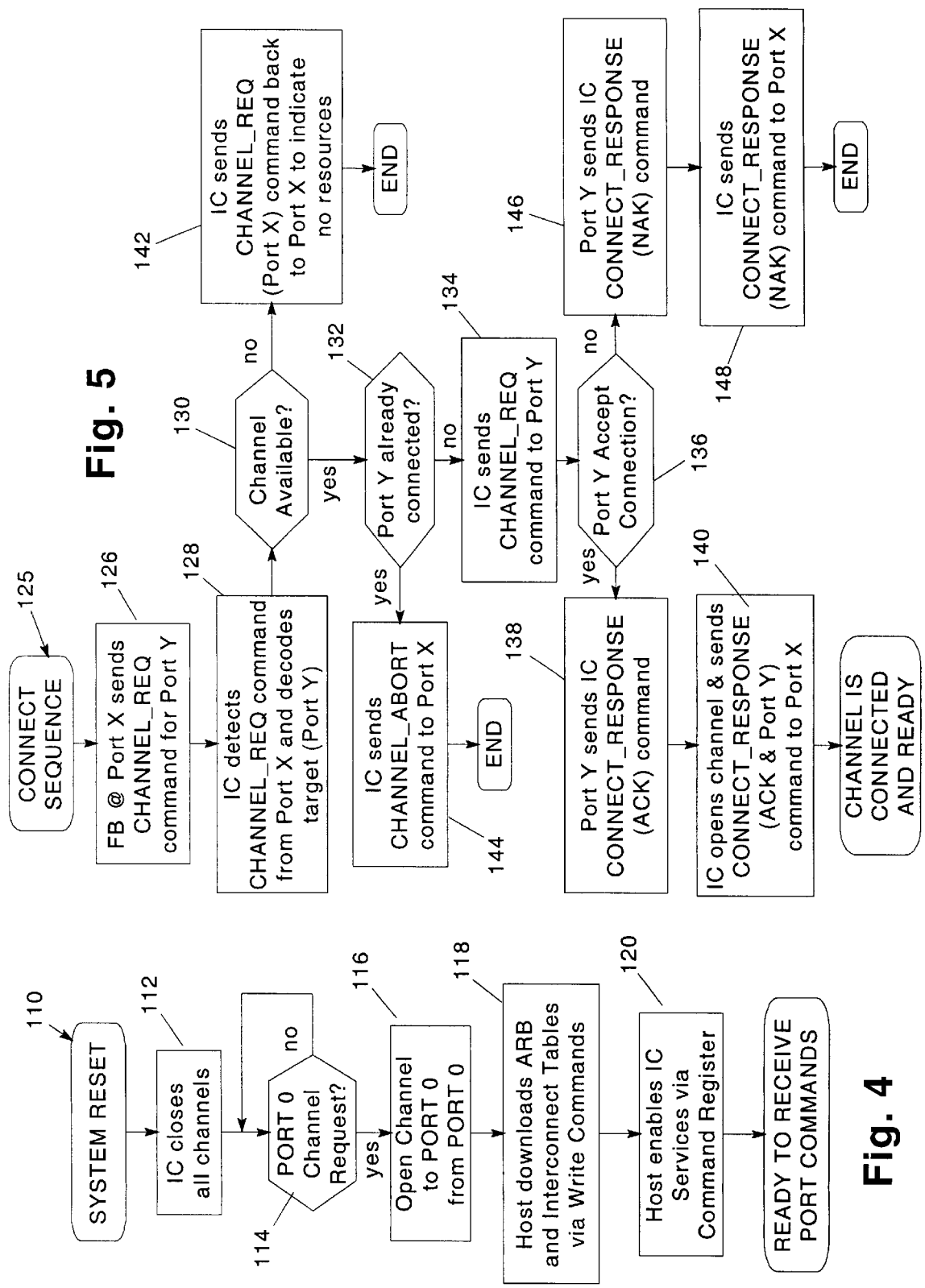

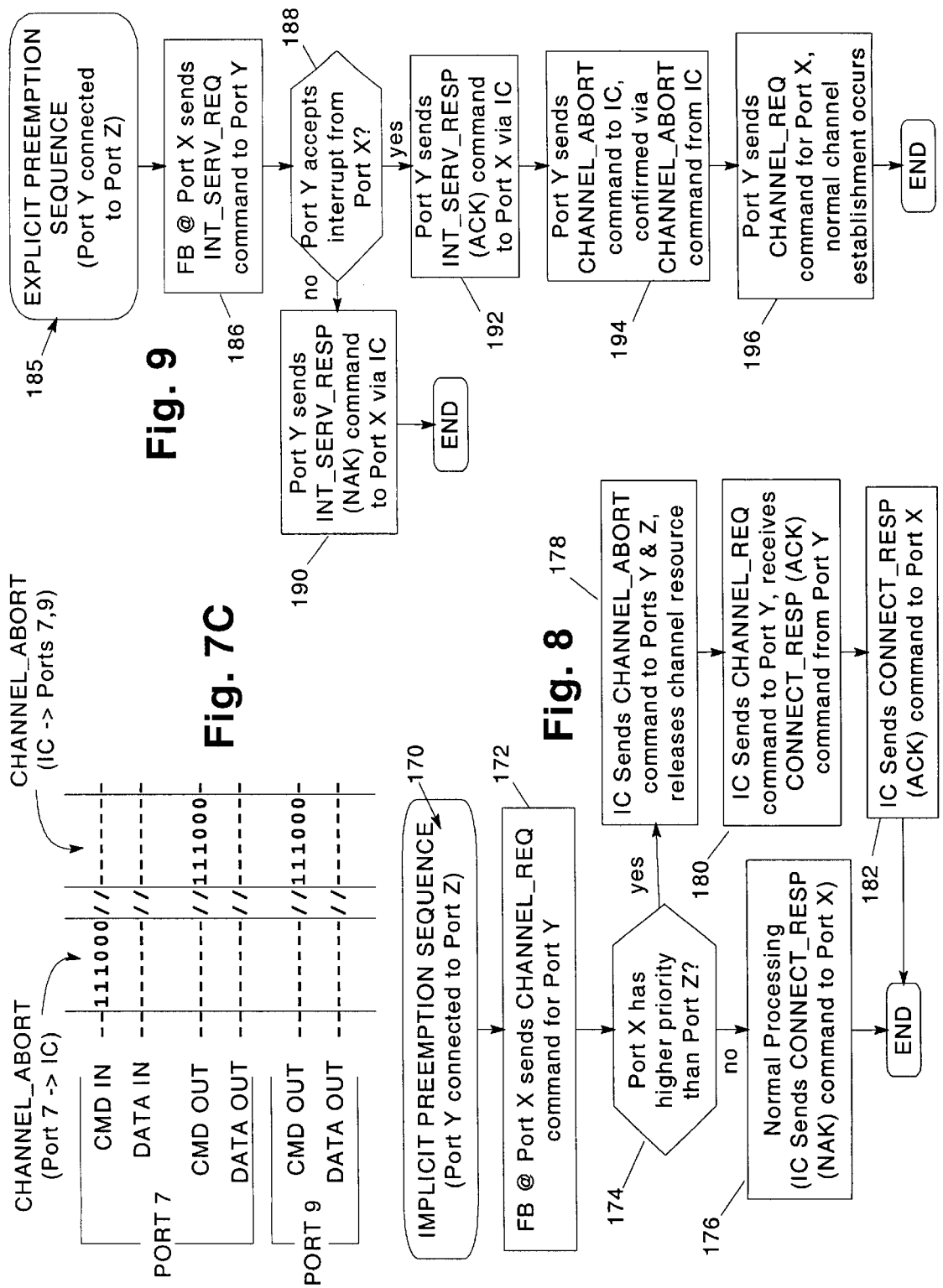

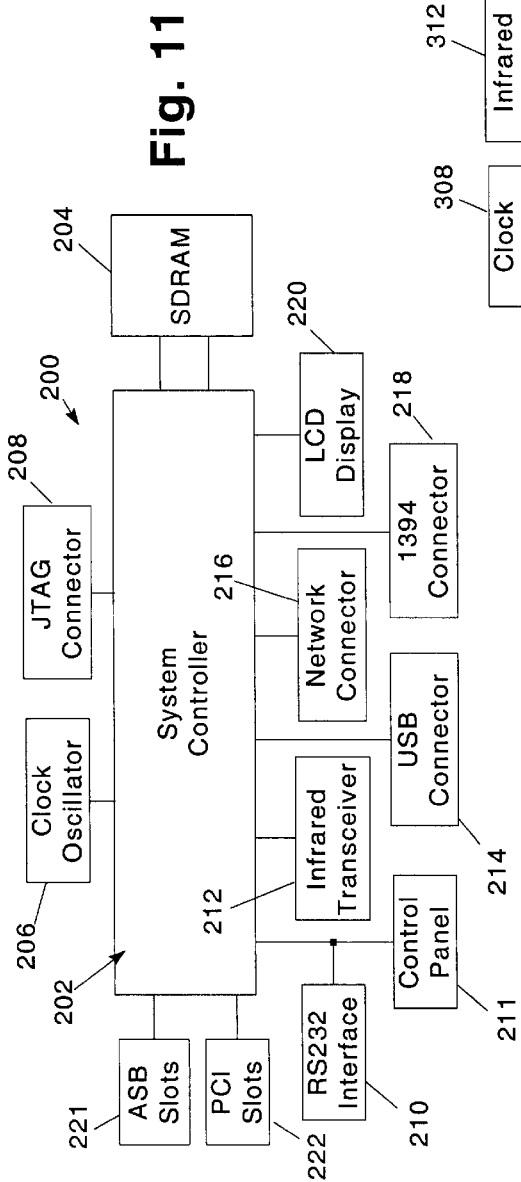

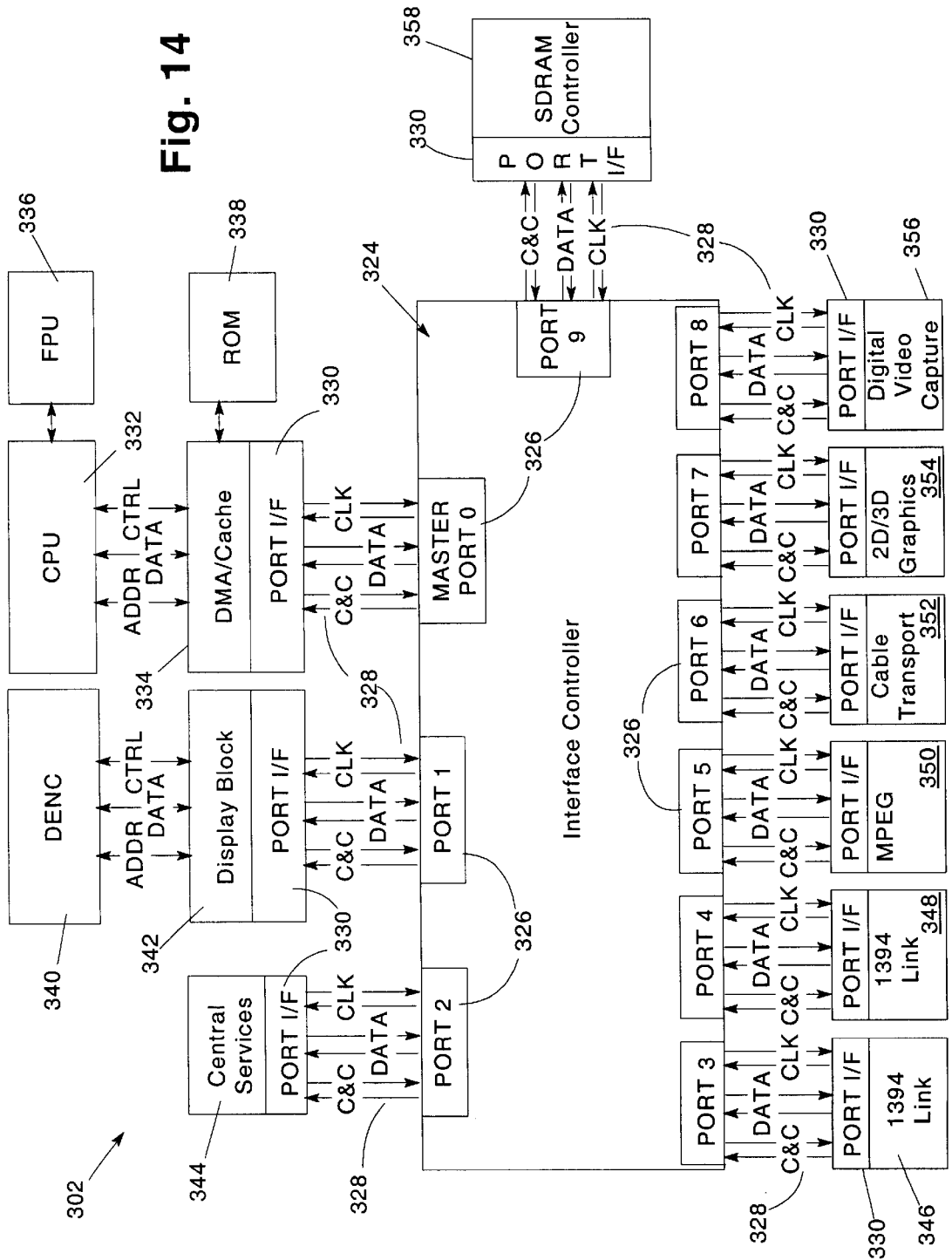

CONCURRENT SERIAL INTERCONNECT FOR INTEGRATING FUNCTIONAL BLOCKS IN AN INTEGRATED CIRCUIT DEVICE

FIELD OF THE INVENTION

The invention is generally related to integrated circuit device design and architecture, and in particular, to an interface for interconnecting multiple functional blocks together in an integrated circuit device.

BACKGROUND OF THE INVENTION

Computer technology has advanced a great deal over the last several decades. Whereas computers once filled entire rooms, and were constructed using individually packaged transistors and/or vacuum tubes to perform different logical functions, innovations in semiconductor manufacturing techniques have enabled multiple transistors, or logic gates, to be integrated together on a single integrated circuit device, or "chip" to perform a greater number of logical functions. The size and number of logic gates that can be integrated together on a chip continues to improve, and whereas early chips had at most only a few hundred gates, more recent chips have been developed that incorporate more on the order of millions of gates. Furthermore, advances in integration have permitted designs that were at one time implemented using multiple chips to be implemented in a single chip.

As chip designs become more complex, however, the design and development process becomes more expensive and time consuming. To alleviate this difficulty, design tools have been developed that enable developers to build custom chips by assembling together smaller, generic components that perform basic functions required for the design. By using generic components, design time and effort are reduced, since circuits do not need to be designed gate by gate. Moreover, the components usually can be tested and optimized prior to assembly in a particular design, so that the testing effort placed on the developer of an overall design is substantially reduced.

The ability to integrate greater numbers of gates onto a chip has also permitted the complexity of the generic components used by design tools to increase. Whereas early generic components replicated basic functions such as multiplexers, registers, counters, etc., more advanced components typically replicate higher level functions such as that of microprocessors, memory controllers, communications interface controllers, etc. These more advanced components are referred to herein as functional blocks, insofar as they are configured to perform one or more high level functions in a design. Functional blocks typically are portable to the extent that they are reusable in different designs. Moreover, they are often autonomous, and thus capable of operating independently and concurrently with other components in a design.

One difficulty associated with the use of components such as functional blocks arises from the need for the various components in a design to communicate with and transfer information among one another. Each component typically has one or more interfaces defined therefor through which communication with other components, or with other devices external to a chip, is handled. These interfaces are typically interconnected with one another over an interconnect system such as a bus to support communication between the different components.

For example, one common manner of interconnecting multiple components is through the use of a multidrop bus. With a multi-drop bus, each component is coupled to a common set of lines, so that each component is capable of receiving every communication passed over the bus. Information passed over a bus is usually associated with a particular address or other identifier so that, only the component that is the target of the information actually receives and processes that information. The other components that are not targeted for the information ignore the information.

Typically, a bus is parallel, incorporating multiple lines so that multiple bits of information can be transmitted simultaneously. Moreover, both control information, used by one component to control the operation of another component, and data, representing the information being manipulated by the components, are typically sent over the same lines in the bus. For example, one bus architecture used in integrating multiple functional blocks in a chip is the Peripheral Component Interconnect (PCI) bus architecture, which is more conventionally used at the board level to interconnect a microprocessor with different peripheral devices in a computer.

However, bus-type interconnections suffer from a number of drawbacks that limit their usefulness in interconnecting multiple functional blocks in a chip. First, parallel bus architectures require a relatively large number of lines, or wires, to run between the various components connected to the bus. Routing wires between components can take up valuable space in a design and reduce the number of components that can fit into the design. Many parallel buses, for example, transmit data in 32- or 64-bit words, requiring at a minimum 32 or 64 lines to be routed to each component, not counting any additional control signals that may be required.

Second, typically only one component can transmit information over a parallel bus at a time. Therefore, other components that desire to transmit information typically must wait until that component is done transmitting its information, or in the alternative, each component must share the bus and transmit pieces of information one after another, which slows down the transmission rate for all components. Also, control information and data typically share the same lines in a parallel bus, and as a result, control operations that might otherwise be capable of being performed within a particular component without requiring access to the bus may have to wait until a data transmission, started prior to the desired control operation, is complete.

Third, the overall speed of a parallel bus may be limited, and thus limit the potential bandwidth of information that can be communicated between components. Bandwidth in a parallel bus is typically improved by increasing the width of the bus or increasing the clock speed of the bus. Increasing the width, however, adds additional lines to the bus, thus adding to the routing density of the design. Increasing the clock speed, on the other hand, may limit the number of components that can be attached to the bus, since the number of components can affect the amount of load and routing parasitics on the bus, each of which limits permissible clock speed.

Therefore, a significant need exists in the art for an improved manner of interconnecting components such as functional blocks and the like in an integrated circuit design, and in particular, for a manner of interconnecting components that is more flexible, compact, fast, reusable, and expandible than conventional designs.

SUMMARY OF THE INVENTION

The invention addresses these and other problems associated with the prior art by providing a circuit arrangement and method that interface multiple functional blocks within an integrated circuit device via a concurrent serial interconnect that is capable of routing separate serial command, data and clock signals between functional blocks in the device. A concurrent serial interconnect consistent with the invention utilizes a plurality of serial ports that are selectively coupled to one another by an interface controller to define one or more logical communication channels between two or more of the serial ports. The logical communication channels in essence function as point-to-point serial interconnections between functional blocks, so that direct communications between logically connected functional blocks can occur.

Through the use of serial interconnects, the number of lines required to be routed to and from individual functional blocks is reduced, thereby simplifying the integration of functional blocks into a design and reducing the routing congestion associated with inter-block communication. In addition, by communicating via separate serial command, data and clock signals, high speed data throughput can be supported. Furthermore, should more than one logical communication channel be supported by an interface controller consistent with the invention, multiple communication sessions can occur in parallel, thereby further increasing overall data throughput.

Another benefit of a concurrent serial interconnect consistent with the invention is that the design of integrated circuit devices and the like is substantially simplified. Functional blocks may be assembled together through the addition of a serial interconnect, with each functional block associated with one of a plurality of serial ports in the serial interconnect by routing separate serial command, data and clock wires therebetween. Design and development is simplified as the addition of new functional blocks to a design typically affects only the design of the serial interconnect, and specifically, the interface controller used therein. Moreover, modular testing and verification is facilitated insofar as communications between functional blocks primarily passes through the serial interconnect, and the need for testing and verifying individual interconnections between functional blocks is often reduced or eliminated.

These and other advantages and features, which characterize the invention, are set forth in the claims annexed hereto and forming a further part hereof However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 4 is a flowchart illustrating the sequence of operations performed during a system reset by the interface controller of FIG. 2.

FIG. 5 is a flowchart illustrating a sequence of operations performed when establishing a logical communication channel in the circuit arrangement of FIG. 1.

FIGS. 7A, 7B and 7C are timing diagrams respectively illustrating exemplary data stream transmissions between two ports during establishment of a logical channel, processing of a read request over the established channel, and release of the channel.

FIG. 8 is a flowchart illustrating a sequence of operations performed during an implicit preemption operation for the circuit arrangement of FIG. 1.

FIG. 9 is a flowchart illustrating a sequence of operations performed during an explicit preemption operation for the circuit arrangement of FIG. 1.

FIG. 10 is a block diagram of the primary logic components in a functional block circuit arrangement consistent with the invention.

FIG. 11 is a block diagram of a development environment data processing system consistent with the invention.

FIG. 13 is a block diagram of a set top box data processing system consistent with the invention.

FIG. 14 is a block diagram of the set top box controller in the set top box data processing system of FIG. 13.

DETAILED DESCRIPTION

Figure 2:
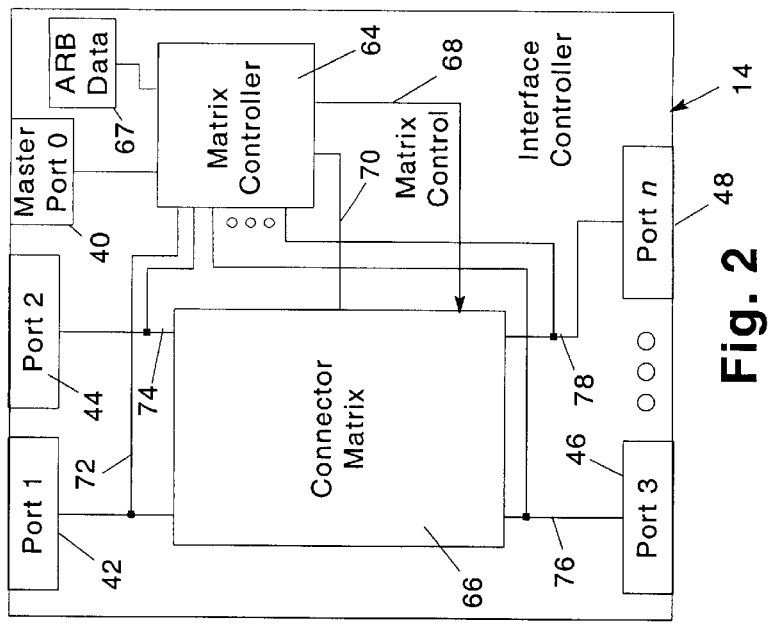
FIG. 2 is a block diagram of the interface controller in the circuit arrangement of FIG. 1.

The illustrated embodiments of the invention generally rely on a concurrent serial interconnect to interface a plurality of functional blocks together in an integrated circuit device circuit arrangement. A concurrent serial interconnect consistent with the invention includes a plurality of serial ports under the control of an interface controller, and coupled via a plurality of direct point-to-point serial interconnects to different functional blocks in the circuit arrangement. The interface controller selectively couples serial ports together to define one or more logical communications channels through which information is passed by the functional blocks associated with the coupled serial ports.

A functional block may be considered to include any logic circuitry configured to perform one or more high level functions in an integrated circuit device design. Most functional blocks are "portable", whereby they are reusable in different designs. Moreover, many functional blocks are also "autonomous", and thus capable of operating independently and concurrently with other components in a design. Examples of functional blocks include, but are not limited to processors, controllers, external interfaces, encoders, decoders, signal processors, and any other analog and/or digital circuitry performing a particular function or set of functions. Often, functional blocks are designed, developed and verified as independent entities, and may even be obtained from third parties, rather than the designers of the overall integrated circuit device.

The integration of multiple functional blocks via a concurrent serial interconnect consistent with the invention is typically implemented in a circuit arrangement for a processor or other programmable integrated circuit device, and it should be appreciated that a wide variety of programmable devices may utilize the various features disclosed herein. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 1:
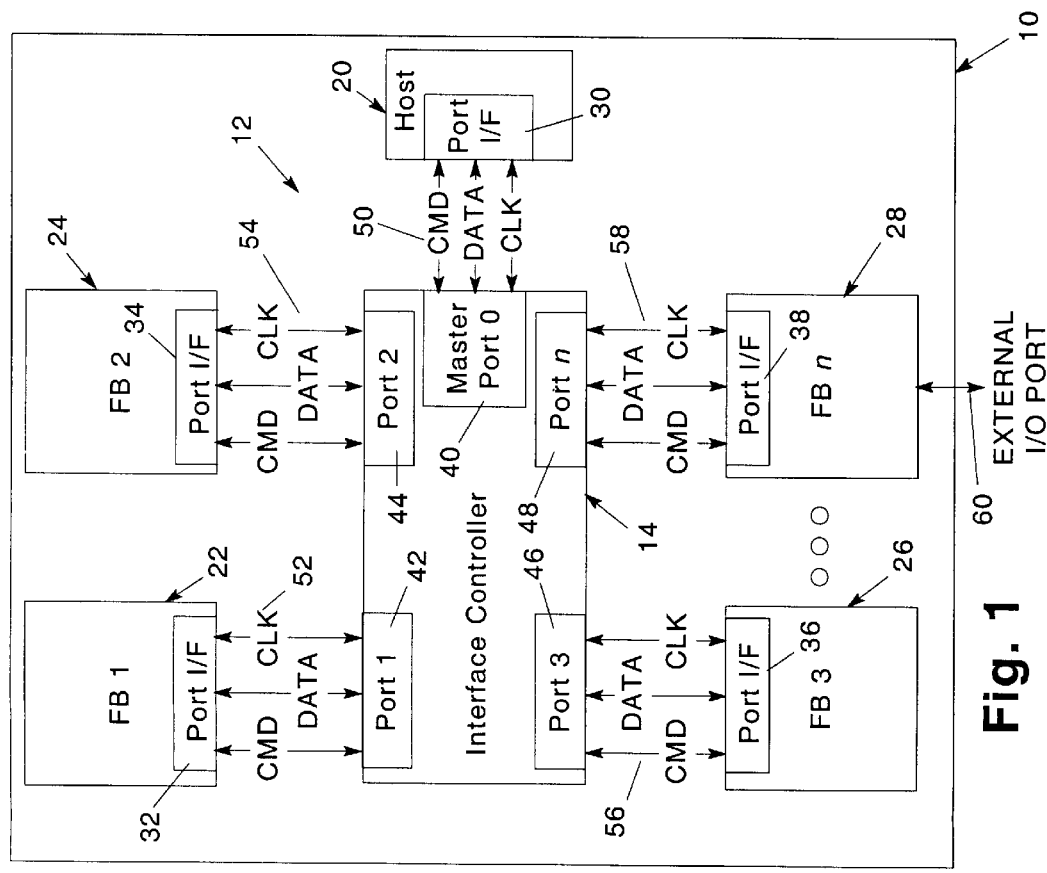
FIG. 1 is a block diagram of a circuit arrangement for an integrated circuit device consistent with the invention.

Turning now to the Drawings, wherein like numbers denote like parts throughout the several views, FIG. 1 illustrates a representative integrated circuit device circuit arrangement 10 consistent with the invention. A concurrent serial interconnect 12, including an interface controller 14, is used to interface a host 20 with a plurality of functional blocks 22, 24, 26 and 28 (also denoted as FB 1 . . . n). Host 20 may also be considered as a functional block that has, in addition to any other high level functionality defined therefor, further logic circuitry to operate as a master device for concurrent serial interconnect 12.

Each functional block 20, 22, 24, 26 and 28 includes a respective port interface 30, 32, 34, 26 and 38 that interfaces with a plurality of serial ports 40, 42, 44, 46 and 48 (also denoted as Ports 0. . . n) over direct point-to-point serial interconnections 50, 52, 54, 56 and 58. Each serial port 40–48 is under the control of interface controller 14 to selectively define one or more logical communication channels between two or more functional blocks 20–28. Moreover, with host 20 functioning as the master for interconnect 12, port 40 defines a master port for the interconnect, through which initialization information is provided by the host.

Each serial interconnection 50–58 includes separate serial command, data and clock lines. The serial command lines are used to transmit serial encoded command & control information between functional blocks or between the interface controller and a functional block. The serial data lines are used to transmit serial encoded data between functional blocks or between the interface controller and a functional block, with the data lines further used to provide additional information for the various commands transmitted over the serial command lines, as will be outlined in greater detail below. The serial data is framed by the serial command information.

The serial clock lines are used to transmit clock signals to synchronize the command and data lines, thereby permitting the functional blocks to operate substantially asynchronously from one another and/or from the interface controller, if desired. In the alternative, the functional blocks may be synchronized by the same distributed clock signal. The command and data lines may be double edge or single edge clocked as desired.

Each such line may be implemented in a number of manners. For example, each line may be implemented using a bidirectional wire, or a pair of unidirectional wires may be provided to support concurrent communication in both directions between a serial port and its associated functional block. In addition, lines may be implemented with single-ended wires, or may be implemented by differential pairs of wires to improve performance. In the implementation discussed hereinafter, for example, differential wire pairs are provided for each of command in, data in and clock in signals (from a functional block to a serial port), as well as for each of command out, data out, and clock out signals (from a serial port to a functional block), resulting in a total of only 12 lines for each serial interconnection 50–58.

In addition, as shown by line 60, each functional block may or may not provide external input and/or output for the integrated circuit device, as dictated by the particular design of the functional block.

As shown in FIG. 2, interface controller 14 includes a matrix controller 64 interfaced with a connector matrix 66. The matrix controller is also interfaced with a memory storage device 67 within which arbitration data, defining an arbitration scheme for the controller, is stored. A set of matrix control lines 68 are output by controller 64 to control the configuration of matrix 66 based upon the defined arbitration scheme for the controller. In addition, matrix 66 receives the command/data/clock signals from each of serial ports 40, 42, 44, 46 and 48, represented by lines 70, 72, 74, 76 and 78, respectively. The serial lines for each serial port are also provided to matrix controller 64 to permit the controller to decode commands passed thereto over the respective serial lines from a particular port so that the matrix controller can reconfigure the matrix as necessary to establish the desired logical communications channel(s) between selected ports.

The configuration of both matrix controller 64 and connector matrix 66 can vary significantly based upon the desired connectivity between the various functional blocks. Any number of known switch matrix implementations may be used, including cross-bar switches, tree structures, etc. Furthermore, a connector matrix may be developed to support any number of concurrent logical communications channels. Moreover, in some implementations, it may be desirable to split the input and output lines between ports to permit one port to receive information from one channel, yet transmit information on another channel.

Figure 3:
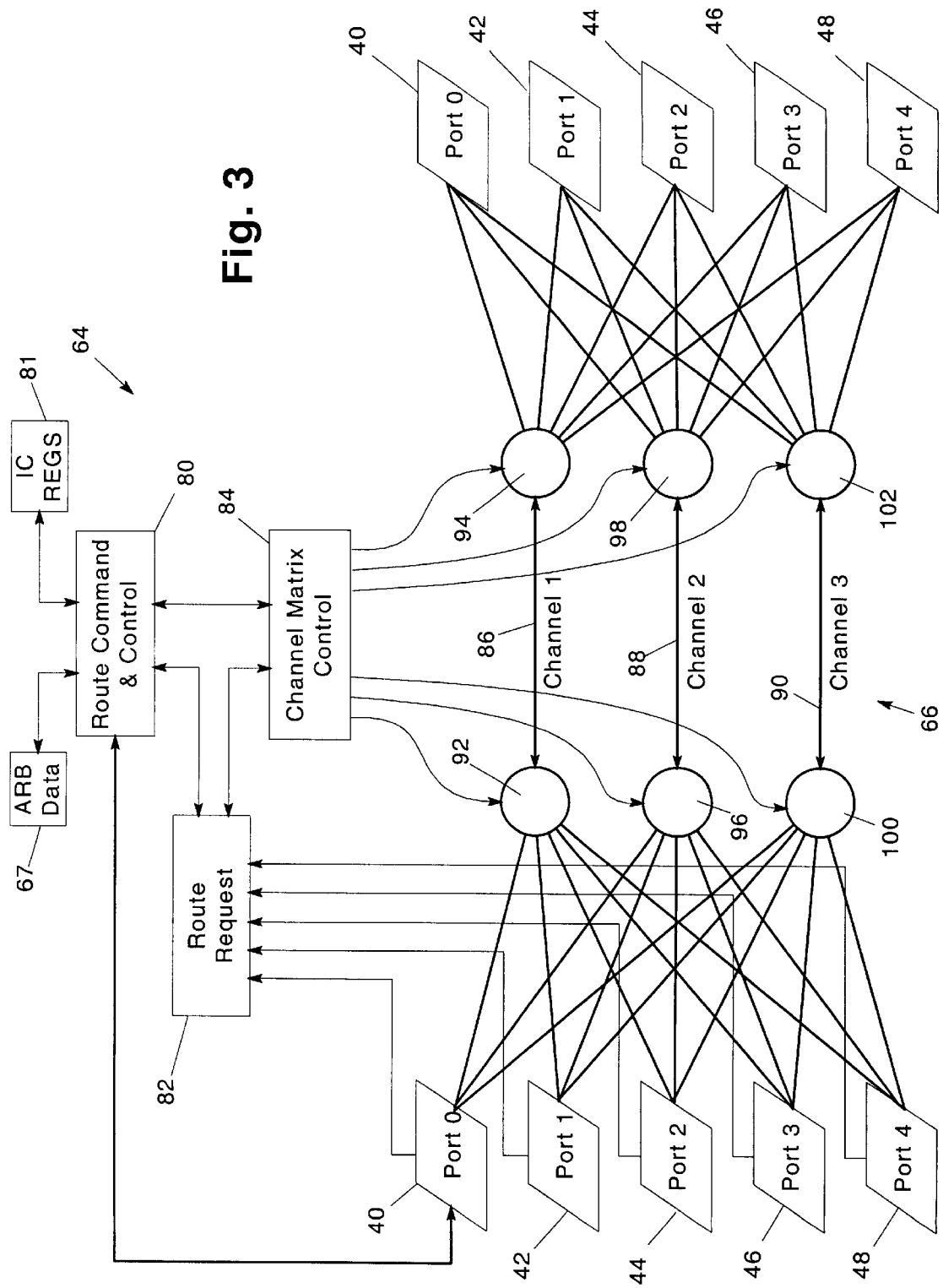
FIG. 3 is a block diagram of a three channel implementation of the interface controller of FIG. 2.

For example, FIG. 3 illustrates one suitable implementation of connector matrix 66 as a three channel cross-bar interconnect for in connecting five serial ports 40–48 (Ports 0 . . . 4). To control matrix 66, matrix controller 64 includes three logic blocks: a route command & control block 80; a route request block 82; and a channel matrix control block 84.

Connector matrix 66 has three channels 86, 88, 90 defined therein for selectively coupling together ports 40–48. For illustrative purposes, each port 40–48 is represented at two positions in the figure, with the left representation representing the port in an "initiator" or "source" mode, and the right representation representing the port in a "receiver" or "target" mode.

Each of the ports 40–48 is coupled to each of channels 86–90 by an associated pair of routers. For channel 86, 5-way routers 92, 94 couple ports 40–48 to the channel. For channels 88 and 90, similarly-configured routers 96, 98 and 100, 102 are used. In the illustrated embodiment, each channel is bidirectional, and thus each router 92–102 functions both as a multiplexer and a demultiplexer, multiplexing the information passed from the ports to a channel, and demultiplexing the information passed from a channel to the ports.

It should be noted that in the illustrated implementation, each port is coupled to each channel, and each channel is bidirectional. Moreover, it is desirable to permit multiple receivers to connect to a given source. As such, the illustrated implementation provides maximal connectivity, as any combination of ports may be coupled to one another, even supporting the connection of one port to itself. However, in other implementations, it may be desirable to simplify the routing circuitry in the connector matrix, e.g., by omitting connections between certain ports and certain channels, by configuring one or more channels as unidirectional channels, by configuring one or more channels as single receiver (non-broadcast) channels, etc. It may also be desirable to support more or less channels as dictated by the bandwidth requirements of the ultimate design.

Logical communications channels may be created through matrix 66 via channel requests received from one or more of ports 40–48. These channel requests are forwarded over the serial command in lines of the ports to route request block 82, as illustrated by the lines coupling the left representations of ports 40–48 with block 82. Block 82 acts much like an instruction parser, snooping the serial command in lines from the ports and decoding the channel requests transmitted thereon. The channel requests are then forwarded to route command & control block 80, which functions as an arbiter to arbitrate and allocate among the channels and grant ports access to the channels based upon a predefined arbitration scheme.

As represented by the bidirectional line from port 40 (master port 0), block 80 is capable of being programmed by a host to implement any number of desired arbitration schemes, including scheduling priorities, preemption rules, interrupt handling, etc. In the alternative, block 80 may be hardwired with a set arbitration scheme, and thus may not require configuration data from the master port. The data necessary for implementing the arbitration scheme is stored in storage device 67, coupled to block 80.

It is also desirable to support a set of control and status registers, referred to herein as interface controller registers 81, for use by block 80. Such registers may be used, for example, to enable/disable some or all interface controller services, to enable/disable one or more ports, to enable/disable explicit and implicit preemption (interrupt) services, and to provide interconnect status information back to a host. It is often desirable to map each of these registers to a particular memory location so that a host (or potentially any functional block) can access the registers via standard read/write commands supported by the interconnect.

Block 80 controls channel matrix control block 84 to allocate a channel to a particular set of ports upon receipt of a route request, based upon the predefined arbitration scheme programmed therein. Channel matrix control block 84 may be implemented, for example, as a sequence of relays that control routers 92–102 to connect the channels to the specific ports identified by block 80, as represented by the lines running from block 84 to each of routers 92–102.

It should be appreciated that the logic and functionality of matrix controller 64 may be allocated to different extent among each of blocks 80–84. Moreover, additional or alternative functionality in the matrix controller may also be supported, as will become more apparent from a reading of the disclosure presented herein.

For the interface controller of FIG. 3, it is believed that with differential clock and data for port routing, and at a 0.2 micron design rule, a clock rate of about 2.5 GHz or better could be implemented, yielding a serial bandwidth of about 312.5 MB/sec (without overhead) per channel or better. Thus, with a three channel matrix, it is expected that a total burst bandwidth of at least about 937.5 MB/sec, without overhead, would be possible with this configuration.

In the illustrated implementation, serial encoded request and response commands or packets are passed between functional blocks and/or between a functional block and the interface controller to implement a concurrent serial interconnect consistent with the invention. Such requests and response commands may be classified into two types, those which are consumed by the interface controller and those which are consumed by a functional block. The former, referred to herein as IC commands, are used to establish or release logical communications channels in the interface controller. The latter, referred to herein as FB commands, are used to communicate status, data length and framing information between functional blocks, as will become more apparent below. Each command is typically identified by a command token, similar in many respects to an opcode. While any number of commands may be used consistent with the invention, one possible set of command tokens defining such a command set is listed below in Table I, with the type of each command also indicated:

TABLE I

Command Tokens

| Token | Type | Command | Description |
|---|---|---|---|
| 0001 | FB | WRITE_ADDRESS | Request to move data from source to target |
| 0010 | FB | WRITE_DATA | Frame for each written data object |
| 0011 | FB | READ_REQ | Request for target to send data to source |
| 0100 | FB | LOCK_REQ | Request for source to atomically access target |
| 0101 | FB | LOCK_RESP | Response to LOCK_REQ |
| 0110 | FB | FLOW_CONTROL | Allows target to control rate data sent to it |
| 0111 | FB | ERROR | Indication of illegal target condition |
| 1000 | FB/IC | INT_SERV_REQ | Interrupt request to a target port |
| 1001 | FB/IC | INT_SERV_RESP | Response to INT_SERV_REQ |
| 1010 | FB/IC | CHANNEL_REQ | Request to establish log. channel with target(s) |
| 1011 | FB/IC | CONNECT_RESP | Response to CHANNEL_REQ |
| 1100 | FB/IC | CHANNEL_ABORT | Request to release all active channels for port |
| 1101 | FB/IC | PORT_STATUS | Query status of another port/functional block |

It should be noted that the $INT_{13} SERV_{13} REQ$, $INT_{13} SERV_{13} RESP$, $CHANNEL\_REQ$, $CONNECT_{13} RESP$, $CHANNEL_{13} ABORT$ and $PORT_{13} STATUS$ commands are overloaded as both IC and FB commands. These commands are IC commands when issued by a functional block, and are FB commands when issued by the interface controller. With separate encoding/decoding circuitry in the interface controller and in each functional block, and with all inter-functional block communications being passed through the interface controller, it will be appreciated that such overloading is not problematic.

Any number of command formats may be used consistent with the invention. In the illustrated implementation, commands are serial encoded, having the general format of a logic 1 start bit, followed by a command token, any operands, and finally a logic 0 stop bit. The commands are used to frame the information on the data lines, and additional information needed by a particular command may be provided on one or both of the command and data lines.

A suitable format for the write address (WRITE$_{13}$ ADDRESS) command is shown below in Table II:

TABLE II

Write Address Command Format (FB to FB)

| Line | Bits | Name | Description (Value) |
|---|---|---|---|
| CMD | 1 | Start | Start Bit (1) |
|  | 4 | Token | WRITE_ADDRESS token (0001) |
|  | 5 | TargetSize | Number of Target Address Bits TS |
|  | 1 | Stop | Stop Bit (0) |
| DATA | TS | TargetAddr | TS bits of Target Address |

The write address command is used to transmit an address to write to in the target functional block, after a logical communications channel has been opened between a source port and one or more target ports. The number of bits in the address is provided on the command line in the TargetSize field, and the target address itself is provided on the data line concurrently with transmission of the write address command on the command line.

Once a write address is provided to a target port, write data (WRITE$_{13}$ DATA) commands are passed from the source port to write to the specified address. A suitable format for the write data command is shown below in Table III:

TABLE III

Write Data Command Format (FB to FB)

| Line | Bits | Name | Description (Value) |
|---|---|---|---|
| CMD | 1 | Start | Start Bit (1) |
|  | 4 | Token | WRITE_DATA token (0010) |
|  | 1 | Stop | Stop Bit (0) |
| DATA | 8 | Data | One byte of data |

Each write data command provides one byte, or 8 bits of data, to write to the specified address. In the illustrated implementation, it may also be desirable to configure both the source and target functional blocks to auto-increment to the next address upon receipt of a write data command, so that multiple write data commands may be sent without having to resend each new address.

A suitable read request (READ$_{13}$ REQ) command format is shown below in Table IV:

TABLE IV

Read Request Command Format (FB to FB)

| Line | Bits | Name | Description (Value) |
|---|---|---|---|
| CMD | 1 | Start | Start Bit (1) |
|  | 4 | Token | READ_REQ token (0011) |
|  | 5 | TargetSize | Number of Target Address Bits TS |
|  | TS | TargeAddr | TS bits of Target Address |
|  | 5 | SourceSize | Number of Source Address Bits SS |
|  | SS | SourceAddr | SS bits of Source Address |
|  | 1 | Stop | Stop Bit (0) |
| DATA | 13 | BlockSize | Number of data bytes requested, up to 8K |

The read request command is used by a source functional block to request data from a target functional block. The command line carries the address in the target where the requested data is stored (TargetAddr), as well as the address in the source where the requested data should be stored (SourceAddr). The number of bytes to transfer is supplied on the data line concurrently with the read request command on the command line.

In the illustrated implementation, the read request command is satisfied by a target functional block by writing the requested data back to the source port using the WRITE$_{13}$ ADDRESS and WRIT$_{13}$ DATA commands discussed above, which simplifies the command set for the interconnect. In the alternative, a separate read data response command from the target to the source could be used to return the requested data to a source functional block.

Lock operations are also supported, to permit a source to atomically manipulate a memory location in the target functional block. A suitable lock request (LOCK$_{13}$ REQ) command format is shown below in Table V, and a lock response (LOCK$_{13}$ RESP) command format is shown below in Table VI:

TABLE V

Lock Request Command Format (FB to FB)

| Line | Bits | Name | Description (Value) |
|---|---|---|---|
| CMD | 1 | Start | Start Bit (1) |
|  | 4 | Token | LOCK_REQ token (0100) |
|  | 5 | TargetSize | Number of Target Address Bits TS |
|  | 4 | LockType | Lock Type |
|  | 5 | ArgSize | Number of Bytes in Lock Argument(s) AS |
|  | 1 | Stop | Stop Bit (0) |
| DATA | TS | TargetAddr | TS bits of Target Address |
|  | AS*8 | Arguments | Lock Argument(s) 1 ... n |

TABLE VI

Lock Response Command Format (FB to FB)

| Line | Bits | Name | Description (Value) |
|---|---|---|---|
| CMD | 1 | Start | Start Bit (1) |
|  | 4 | Token | LOCK_RESP token (0101) |
|  | 5 | ArgSize | Number of Bytes in Return Argument(s) AS |
|  | 1 | Stop | Stop Bit (0) |
| DATA | AS*8 | Arguments | Return Argument(s) 1 ... n |

Several different types of lock operations are supported, based upon the LockType field in the lock request command. For each lock type, a different number of one byte arguments will be supplied in the lock request command, and a different number of one byte arguments will be returned in the lock response command returned by the target. The arguments themselves are supplied on the data lines, and the number of arguments are specified in the ArgSize field of both the lock request and lock response commands. Examples of desirable lock types include byte compare and swap, byte subtract if greater than or equal to, and other lock types known in the art.

A target may also issue additional commands to reply to a source request. For example, a flow control (FLOW$_{13}$ CONTROL) command may be used by a target to control the rate in which data is sent to it. In the illustrated embodiment, it is desirable for a target to always be ready to accept when a logical communications channel is established. The flow control command therefore can indicate back to a source that further transmissions must be delayed, resulting in the source delaying further transmissions until a ready indication is passed by the target. A suitable format for the flow control command is shown below in Table VII, and it should be appreciated that additional status codes may be supported beyond simply ready and busy:

TABLE VII

Flow Control Command Format (FB to FB)

| Line | Bits | Name | Description (Value) |
|---|---|---|---|
| CMD | 1 | Start | Start Bit (1) |
| | 4 | Token | FLOW_CONTROL token (0110) |
| | 2 | Status | Port Status (00=BUSY, 01=READY) |
| | 1 | Stop | Stop Bit (0) |

A target may also be required to return an error in response to a request from a source, e.g., using an error (ERROR) command. Any number of error types may be supported, e.g., protected address, read only, etc. One suitable format for an error command is shown below in Table VIII:

TABLE VIII

Error Command Format (FB to FB)

| Line | Bits | Name | Description (Value) |
|---|---|---|---|
| CMD | 1 | Start | Start Bit (1) |
| | 4 | Token | ERROR token (0111) |
| | 4 | Type | Error Type (0001=Prot. Address, 0010=Read Only) |
| | 1 | Stop | Stop Bit (0) |

It may also be desirable to support the use of interrupts over the concurrent serial interconnect. In the illustrated implementation, an interrupt service request ($INT\_SERV_{13}$ REQ) command is supported to permit a functional block to request an interrupt from the host, via the interface controller and master port, as well as from another functional block (e.g., to perform explicit preemption). With this command, it is desirable to provide to the interface controller an indicator of the target, or requested port, as well as an address of a service routine in the target port for use in handling the interrupt. When the command is sent from the interface controller to the target port, an indication of the requesting port is provided in lieu of the target port. In the alternative, different interrupt types could be supported, with only an interrupt type transmitted so that a dedicated service routine defined for that interrupt type in the target may be executed. One suitable command format for the interrupt service request command is shown below in Table IX:

TABLE IX

Interrupt Service Request Command Format (FB/IC to IC/FB)

| Line | Bits | Name | Description (Value) |
|---|---|---|---|
| CMD | 1 | Start | Start Bit (1) |
| | 4 | Token | INT_SERV_REQ token (1000) |
| | 4 | ReqPort | Requested Port ID (FB to IC)/Requesting Port ID (IC to FB) |
| | 5 | SRAddrSize | Number of Interrupt Service Routine Address bits RS |
| | 1 | Stop | Stop Bit (0) |
| DATA | RS | SRAddr | RS bits of Interrupt Service Routine Address |

In response to an interrupt service request, the target, via the interface controller, typically responds to the requesting port with an interrupt service response ($INT_{13}\ SERV_{13}$ RESP) command, used to indicate whether the interrupt was granted or denied, and typically including one of a different number of acknowledgment codes to indicate different responses. A suitable format for the interrupt service response command is shown below in Table X:

TABLE X

Interrupt Service Response Command Format (FB/IC to IC/FB)

| Line | Bits | Name | Description (Value) |
|---|---|---|---|
| CMD | 1 | Start | Start Bit (1) |
| | 4 | Token | INT_SERV_RESP token (1001) |
| | 4 | ACK/NAK | Acknowledgment Code |
| | 1 | Stop | Stop Bit (0) |

As discussed above, direct inter-functional block communications typically cannot occur until a logical communications channel is established between a source functional block and one or more target functional blocks. To handle the establishment of such a channel, a channel request ($CHANNEL_{13}$ REQ) command is used. The channel request command is initially directed by a source to the interface controller, to request establishment of a logical communications channel. If an available channel exists to the specified target(s), a channel request command is then forwarded by the interface controller to the target port(s). Suitable formats for the channel request command from the source to the interface controller, and from the interface controller to the target(s), are shown below in Tables XI and XII:

TABLE XI

Channel Request Command Format (FB to IC)

| Line | Bits | Name | Description (Value) |
|---|---|---|---|
| CMD | 1 | Start | Start Bit (1) |
| | 4 | Token | CHANNEL_REQ token (1010) |
| | 2 | Type | Channel type (00=Unidirectional, 01=Bidirectional) |
| | 4 | NumPorts | Number of Target Ports NP |
| | 1 | Stop | Stop Bit (0) |
| DATA | NP*4 | TargetPorts | Target Port ID's |

TABLE XII

Channel Request Command Format (IC to FB)

| Line | Bits | Name | Description (Value) |
|---|---|---|---|
| CMD | 1 | Start | Start Bit (1) |
| | 4 | Token | CHANNEL_REQ token (1010) |
| | 2 | Type | Channel type (00=Unidirectional, 01=Bidirectional) |
| | 4 | SourcePort | Source Port ID |
| | 1 | Stop | Stop Bit (0) |

In this implementation, a maximum of 16 ports are supported, although any number of ports may be supported by varying the sizes of the Port ID fields. Also, it may be seen that unidirectional and bidirectional channel types are supported. With the unidirectional type, broadcast channels with multiple targets are permitted. Bidirectional channels support only a single target. Moreover, the channel request command from the source to the interface controller omits the Port ID of the source (since this information is known by the interface controller), but the channel request command from the interface controller supplies this Port ID to the target(s).

Upon receipt of a channel request command, a target node has the ability to accept or deny establishment of a channel, via providing an appropriate connect response (CONNECT$_{13}$ RESP) command back to the interface controller, which is then forwarded onto the source. Appropriate formats for both phases of the connect response command are shown in Tables XIII and XIV:

TABLE XIII

Connect Response Command Format (FB to IC)

| Line | Bits | Name | Description (Value) |
|---|---|---|---|
| CMD | 1 | Start | Start Bit (1) |
|  | 4 | Token | CONNECT_RESP token (1011) |
|  | 4 | ACK/NAK | Acknowledgment Code |
|  | 1 | Stop | Stop Bit (0) |

TABLE XIV

Connect Response Command Format (IC to FB)

| Line | Bits | Name | Description (Value) |
|---|---|---|---|
| CMD | 1 | Start | Start Bit (1) |
|  | 4 | Token | CONNECT_RESP token (1011) |
|  | 2 | ACK/NAK | Acknowledgment Code |
|  | 4 | RespPort | Port ID of Responding Port |
|  | 1 | Stop | Stop Bit (0) |

The acknowledgment code provided from the target to the interface controller can be used to accept or grant the request, whereby the controller establishes the channel and responds to the source to indicate the establishment of the channel. The acknowledgment code may also be used to deny establishment of the channel, e.g., if the target is busy and does not want to be preempted. As with the channel request command, the Port ID of the target need not be provided to the interface controller, but typically will be forwarded back to the original source by the interface controller in the connect response command.

Additional commands may be used by the concurrent serial interconnect to control the establishment, release and operation of logical communications channels. A channel abort (CHANNEL$_{13}$ ABORT) command is issued by either a source or target to abort any pending channel traffic and request that the interface controller release all channels connected to the requesting port. If the requesting port was the initiating source for the channel, all associated ports in the channel are released. If the requesting port was one of multiple targets, only its port is released, with the interface controller sending a connect response command to the source to indicate a channel status change. The same command format is used from a requesting port to the interface controller, and from the interface controller to each port for which it is desired to release a channel. One suitable format for the channel abort command is shown below in Table XV:

TABLE XV

Channel Abort Command Format (IC to FB and FB to IC)

| Line | Bits | Name | Description (Value) |
|---|---|---|---|
| CMD | 1 | Start | Start Bit (1) |
|  | 4 | Token | CHANNEL_ABORT token (1100) |
|  | 1 | Stop | Stop Bit (0) |

A port status (PORT$_{13}$ STATUS) command is also supported to permit polling of ports to verify the proper operation thereof. Two levels of polling are supported in the illustrated embodiment. A first level requests an indication of what (if any) ports a particular port is connected to. A second level requests an indication of the status of the functional block to which a particular port is connected, e.g., whether the functional block is operating correctly, ready to receive data, etc. The former level typically can be handled solely in the interface controller in response to a port status request from one of the ports, given that the current routing/channel configuration of the interface controller can be used to determine what ports are connected to one another. For example, appropriate port status requests may be intercepted and processed by block 82, with the resulting status information forwarded to block 84 for transmission back to the requesting port (FIG. 2.) The latter level, however, typically requires interaction with the port for which the status is being requested, thereby requiring the interface controller to forward appropriate requests to particular ports. Separate command formats may be used from a functional block to the interface controller, and between the interface controller to a functional block, as shown below in Tables XVI and XVII:

TABLE XVI

Port Status Command Format (FB to IC)

| Line | Bits | Name | Description (Value) |
|---|---|---|---|
| CMD | 1 | Start | Start Bit (1) |
|  | 4 | Token | PORT_STATUS token (1101) |
|  | 2 | ACK/NAK | Acknowledgment Code |
|  | 1 | Stop | Stop Bit (0) |

TABLE XVII

Port Status Command Format (IC to FB)

| Line | Bits | Name | Description (Value) |
|---|---|---|---|
| CMD | 1 | Start | Start Bit (1) |
|  | 4 | Token | PORT_STATUS token (1101) |
|  | 4 | RespPort | Port ID of Responding Port |
|  | 4 | NumPorts | Number of Ports NP that Responding Port is Currently Connected To |
|  | 2 | ACK/NAK | Acknowledgment Code |
|  | 1 | Stop | Stop Bit (0) |
| DATA | NP*4 | ConnPorts | Port ID's of Ports Connected to Responding Port |

Thus, form the interface controller to the functional block, an indication of the identity of each port connected to the port being polled is provided on the data lines. In addition, various acknowledgment codes can be returned to indicate any number of possible conditions for the connections, ports and/or functional blocks to which the ports are connected.

It should be appreciated that the command formats discussed herein are but one possible set of formats. The invention should therefore not be limited to the particular implementation discussed herein.

Figure 6:
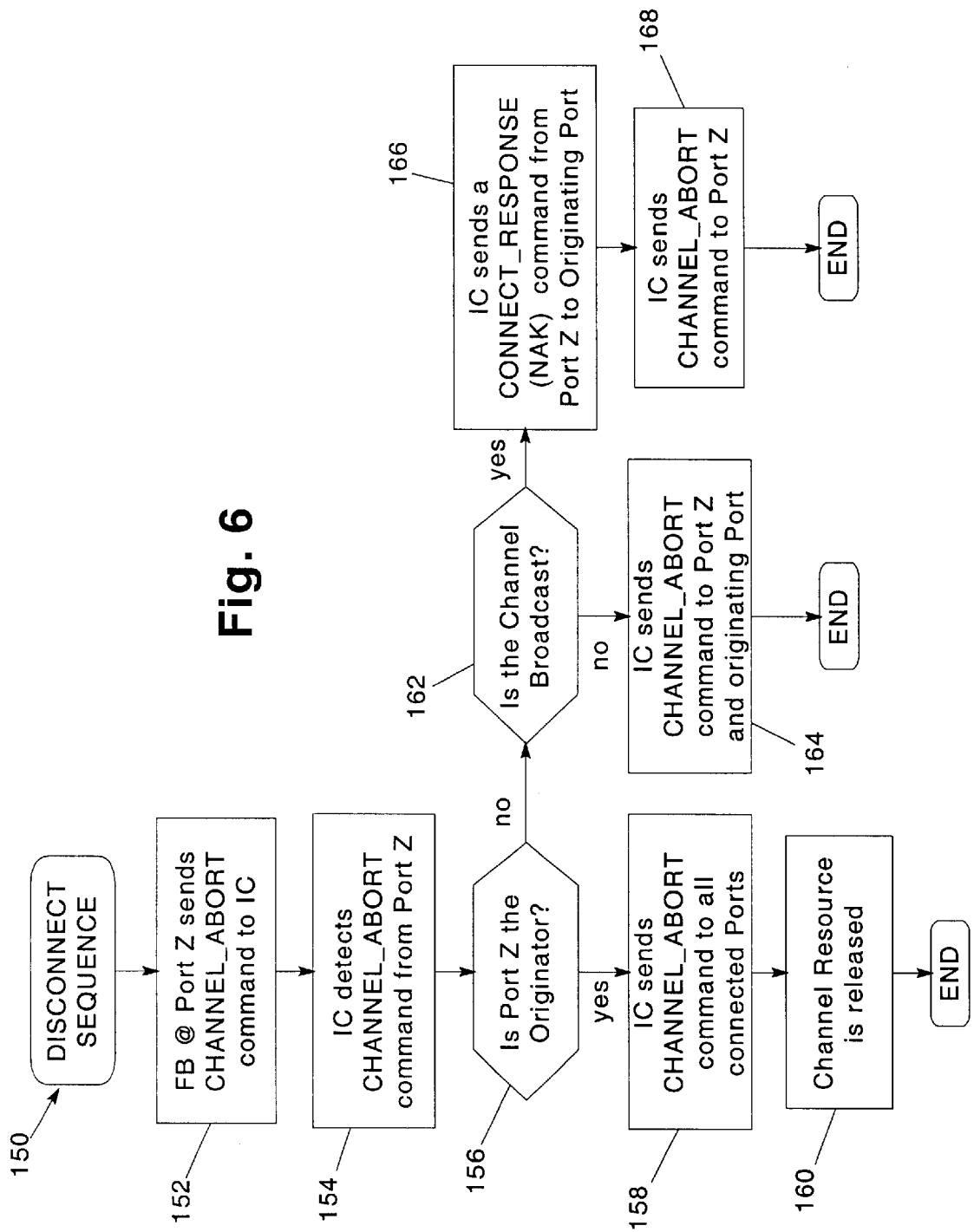
FIG. 6 is a flowchart illustrating a sequence of operations performed when releasing a logical communication channel in the circuit arrangement of FIG. 1.

To further illustrate the operation of a concurrent serial interconnect, the operations performed during initialization of the interconnect,during establishment of a logical communications channel, and during release of a logical communication channel are shown respectively in FIGS. 4–6.

FIG. 4 illustrates, for example, a system reset operation 110 performed during initial startup. In this implementation, the interface controller is initialized by the host via the master port. Operation 110 begins in block 112, with the interface controller closing all logical communications channels. Next, a loop is initiated in the interface controller at block 114 to wait for a channel request command from the master port (port O). Upon receipt of such a command, the interface controller opens a logical communication s channel with the master port as both the source and target for the channel in block 116.

Next, in block 118 the host downloads arbitration and interconnect tables to the interface controller, in particular to configure the route command & control logic block 80 (FIG. 3) to implement the desired arbitration scheme. In the illustrated implementation, this is performed via the write commands described above, using a known address for the tables in the interface controller. It should be appreciated that the interface controller logic is configured to specifically detect this initialization mode when a logical channel is established with the master port as both source and target. Furthermore, it should be appreciated that, rather than downloading table data, the actual microcoded routines necessary for implementing a particular arbitration scheme may also be downloaded in other implementations. Furthermore, in other implementations, if only a fixed arbitration scheme is used, no data may be required to be downloaded to the interface controller.

Next, in block 120, the normal operational mode for the interface controller is activated by the host writing to the memory location for the appropriate control register in the interface controller (e.g., in block 80 thereof, shown in FIG. 3) using the write commands discussed above. Upon writing to this register all interface controller services are enabled, and the interface controller is ready to receive port commands.

FIG. 5 illustrates at 125 a sequence of operations performed during establishment of a logical communications channel. Starting at block 126, an initiating port (denoted as Port X), sends a channel request command to the interface controller, designating a target port (denoted as Port Y). Next, in block 128, the interface controller receives the command and decodes the target information therefrom.

Next, in block 130, the interface controller determines whether an open channel is available. If so, the interface controller next determines in block 132 whether the target port is already connected to a channel. Assuming first that the target is not connected, the interface controller then forwards a channel request command to the target port in block 134.

Next, as illustrated in block 136, the target port determines whether to accept the connection. If a target port accepts the connection, the port sends a connection response command back to the interface controller in block 138, specifying an acknowledge (ACK) acknowledgment code. The interface controller establishes the logical communications channel, and then forwards a connect response command back to the source port in block 140. Upon completion of block 140, the channel is established, and communications between the source and target(s) may commence.

Returning to block 130, if no channel is currently available in the interface controller, the interface controller sends a channel request command back to the requesting port in block 142, specifying that port as the source port, to indicate to the requesting port that no resources are available. In the alternative, another command could be used to indicate this error condition.

Next returning to block 132, if port Y is already connected to a channel, the interface controller sends a channel abort command to the requesting port in block 144 to indicate that the target port is not available. Other commands could be used in the alternative. When a particular target port is not available, a preemption operation (discussed below) may be used to attempt to override the existing channel and establish a new channel to the target. Further, as an alternative, it may also be desirable to provide a queuing mechanism in the interface controller to save an unsuccessful channel request command, and try to issue the command later, rather than immediately bouncing the request.

Next returning to block 136, if the target port wishes to deny the channel request, the port sends a connect response command back to the interface controller in block 146, specifying a non-acknowledge (NAK) acknowledgment code in the command. The interface controller then forwards the code to the requesting port in a connect response command in block 148, whereby no channel is established. As above, a preemption operation (discussed below) may be used to obtain access to the target port when the normal connect sequence is unsuccessful.

It should be appreciated that, to establish multi-target channels, the interface controller is required to monitor communications with the multiple targets. For example, in the illustrated implementation, the interface controller will determine whether each target port is already connected and send back channel abort commands to the requester port for any already-connected target ports (as in blocks 132 and 144). This may result either in the entire channel request operation being denied, or in the alternative, may result in the channel being established without any already-connected target ports.

Also, for any non-connected targets, the interface controller sends channel request commands to each target (as in block 134). Furthermore, the interface control monitors for a connect response command from each target, and forwards each response along to the requesting port. As above, either the channel may be denied if not all targets accept the connection, or the channel may be established with the other targets that accept the connection.

FIG. 6 illustrates at 150 a sequence of operations performed to release a logical communications channel, either from all ports on the channel or one target port coupled thereto. The channel release operation is initiated in block 152 by the functional block at a specific port (Port Z) sending a channel abort command to the interface controller. This command is then detected by the interface controller in block 154, whereby in block 156 the interface controller determines whether the requesting port is the originator (source) port for the channel.

If so, it is desirable to release all connected ports from the channel, so the interface controller sends a channel abort command to all connected ports in block 158. The channel resource is then released by the interface controller in block 160, and the operation is complete.

Returning to block 156, if the requesting port is not the originator of the channel, the interface controller determines in block 162 whether the channel is a broadcast channel (i.e., one with multiple targets). If not, the interface controller sends channel abort commands to both the requesting port and the originating port in block 164, and the operation is complete. The channel abort command back to the requesting port confirms that the disconnect was successful, and the channel abort command to the originating port indicates that the requesting port has been disconnected. Note that the channel resource is not released; instead the originator of the channel must send another channel abort command to the interface controller if release of the channel is desired. In the alternative, a target port may be able to release a channel in other implementations.

Returning to block 162, if the channel is a multi-target channel, the interface controller sends a connect response command to the originating port in block 166, indicating a non-acknowledge (NAK) acknowledgment code and identifying the requesting port. This has the effect of updating the status of the requesting port in the originating port, so that the originating port has been informed that the requesting port has been disconnected. Next, in block 168, the interface controller sends a channel abort command back to the requesting port to confirm that the port has been disconnected. The operation is then complete.

Figure 7A:
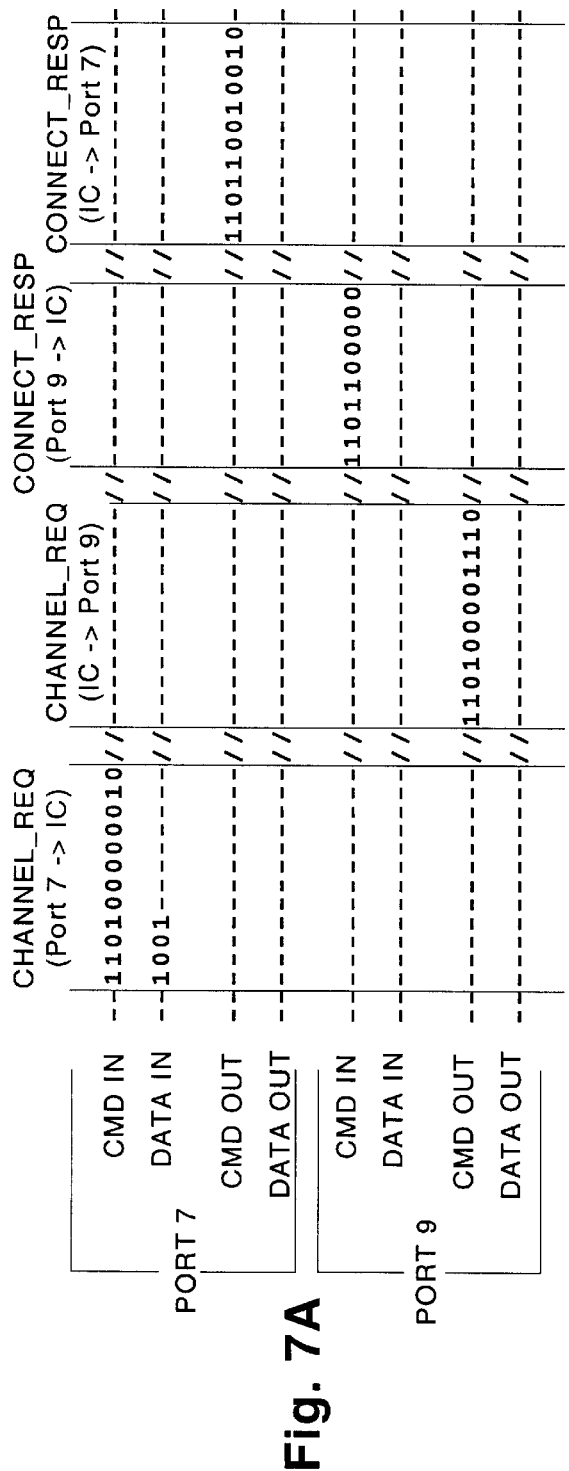
Figure 7B:
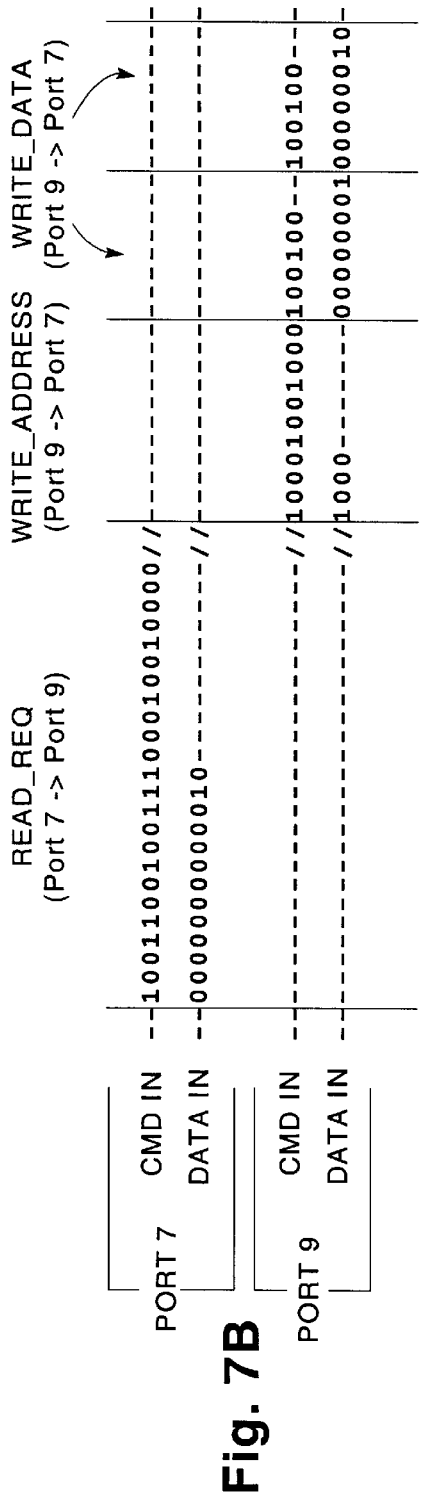

As an example of the general operation of the concurrent serial interconnect, FIGS. 7A–7C illustrate sample commands issued between a pair of functional blocks to perform a basic read operation from a first functional block to a second functional block. To simplify the example, it is assumed that each functional block has a four-bit wide memory address space (16 total accessible memory addresses), and that a maximum of 16 ports can be coupled to the interconnect. In this example, a functional block with a port identifier of 7 desires to read the contents of two sequential memory addresses in a functional block with a port identifier of 9, starting at memory address 14 (0x1110). The functional block at port 7 wishes that the contents of these memory addresses (which are assumed to be 0x00000001 & 0x00000010) be written into the two sequential memory addresses starting at memory address 8 (0x1000).

As shown in FIG. 7A, to perform the read operation, a channel must be established between ports 7 and 9. Port 7 therefore sends a channel request command to the interface controller, indicating that a unidirectional channel is requested with port 9. Assuming a channel is available, sometime thereafter (as represented by the "//" characters) the channel request command is forwarded by the interface controller to port 9, indicating therein that port 7 has requested a channel. Assuming that port 9 is available, the port forwards a connect response command back to the interface controller with an ACK acknowledgment code, which results in the interface controller forwarding a connect response command back to requesting port 7, indicating an ACK code and identifying port 9. A channel is then established.

Next, as shown in FIG. 7B, the functional block connected to port 7 outputs to the command and data in lines of port 7 a read request command. Based upon the existing channel, the information is passed directly to the command and data out lines of port 9 by the interface controller (not shown separately). The read request command specifies on the command in line a target address of 0x1110 and a source address of 0x1000, and indicating on the data in line that 2 data bytes are requested.

Sometime thereafter, the functional block at port 9 responds to the read request by outputting a write address command on the port 9 command and data in lines. The information is passed directly by the interface controller to the command and data out lines of port 7. The write address command specifies on the command in line that a four-bit address (address 0x1000) is on the data in line, corresponding to the source address provided in the read request command. The write address command is then followed immediately by two write data commands, each of which provides the respective requested contents of memory addresses 0x1110 and 0x111.

Upon completion of the read/write commands, the channel between ports 7 and 9 is still active until released. Thus, as shown in FIG. 7C, when the functional block at port 7 determines the channel is no longer needed, a channel abort command is passed to the interface controller, which thereafter outputs channel abort commands to both port 7 and port 9, resulting in the channel resource being released. Processing of the read operation is then complete.

It is to be noted that, in each case in which information is passed on both the command and data lines, the command lines (and specifically the contents thereof) frame each command to maintain alignment between information in the command and data lines. Thus, commands can have a variable length. In the alternative, a fixed command length may be used. It should also be appreciated that a clock signal will also be transmitted along with all command and data information (not shown).

When a particular port and/or channel is not available, different manners of preempting an existing channel may be supported. For example, an implicit preemption operation may be supported. For an implicit preemption operation, different ports are granted varying priorities within the arbitration scheme defined in and/or programmed into the interface controller. For example, it is often desirable to prioritize the master port over other ports, thereby permitting the host to always be able to preempt other functional blocks.

The basic sequence of operations performed during an implicit preemption operation are shown at 170 in FIG. 8 (the sequence of operations may be considered to replace block 144 in the connection sequence of FIG. 5). In this sequence, it is assumed that port X is requesting a channel with port Y while port Y is already connected by an existing channel to port Z. As shown in block 172, as with a normal connection sequence, the functional block at port X sends a channel request command for port Y, which the interface controller receives and decodes. The interface controller determines that port Y is already connected, but instead of simply returning a NAK to port X, the interface controller determines in block 174 whether port X has a higher priority than port Z. If not, the interface controller resumes normal processing in block 176, essentially sending a connect response command to port X with a NAK acknowledgment code.

If, however, port X has a greater priority than port Z, the interface controller sends a channel abort command to ports Y and Z in block 178 to release the existing channel resource. Next, in block 180 the interface controller forwards a channel request command to port Y, which due to the recent release of port Y from a channel, results in a connect response command with an ACK acknowledge code being returned by port Y. Next, in block 182 the interface controller forwards the connect response command to port X to establish the new channel. Communications between ports X & Y are then permitted.

In addition to or in lieu of implicit preemption, explicit preemption may also be supported. With explicit preemption, a functional block requests an interrupt with another functional block after an unsuccessful connection attempt. In this situation, the decision as to whether to grant an interrupt is made in the target functional block, rather than the interface controller. The interface controller merely acts as a messenger to pass the interrupt and acknowledgment between the ports coupled to the functional blocks.

For example, FIG. 9 illustrates at 185 a sequence of operations for an explicit preemption operation. Assuming that port X attempted to connect to port Y, but was unsuccessful because the port was coupled to port Z, the functional block at port X sends an interrupt service request command to port Y via the interface controller. Next, port Y determines whether to accept the interrupt in block 188. This determination typically is based upon a particular arbitration scheme defined within the functional block connected to port Y. If the functional block decides not to grant the interrupt, the port sends an interrupt service response command back to port X via the interface controller in block 190, indicating a NAK acknowledgment code. The interrupt is thus denied.

If, however, the functional block decides to grant the interrupt, port Y immediately forwards an interrupt service response command back to port X via the interface controller in block 192, indicating an ACK acknowledgment code. Next, in block 194, port Y sends a channel abort command to the interface controller, which results in the interface controller disconnecting port Y from the channel and releasing the channel (if appropriate) as discussed above. A channel abort command is also returned to port Y as confirmation.

Next, in block 196 port Y sends a channel request command for port X, resulting in establishment of a new channel between ports X and Y in the manner discussed above with respect to FIG. 5. The interrupt is thus serviced, and communications between ports X & Y are permitted.

It should be noted that in the illustrated implementation it is desirable (though not necessary) to send an interrupt service response command back to the requesting port prior to releasing the servicing port and establishing the new channel. An advantage of this configuration is that the servicing port may delay servicing of the interrupt as needed, yet still confirm to the requesting port that the interrupt will be serviced so that the requesting port will wait for the establishment of the new channel. For example, incoming interrupts to a port may be queued up and handled according to an arbitration scheme with this configuration.

It should be appreciated that the various functions performed by the interface controller, the ports, and the functional blocks (specifically the port interfaces defined therein) described herein are by no means the exclusive implementations of the invention, and thus, the invention should not be limited solely to such herein described implementations. Moreover, it should be appreciated that implementation of the functionality of the interface controller, ports, port interfaces and functional blocks in appropriate logic circuitry, as well as the implementations of suitable program code executed by any of such components, would be well within the ability of one of ordinary skill in the art having the benefit of the instant disclosure.

As an example, one possible implementation of a functional block circuit arrangement is illustrated at 400 in FIG. 10. Circuit arrangement 400 includes the functional block logic 402 that implements the primary operational functionality of the functional block, as well as port interface logic 403. The finctionality of the port interface is allocated among a plurality of logic blocks, including an address decoder/encoder block 404, a data decoder/encoder block 406, a read/write control block 408, a command control block 410, a clock block 412, write and read FIFO buffer blocks 414, 416, a request/grant controller block 418, a data flow controller block 420, DATA transmit and receive serializer/deserializer (SERDES) blocks 422, 424, command & control encoder and decoder blocks 426, 428 and clock synchronizer/generator block 430. Other logic implementations may be used in the alternative.

Concurrent serial interconnects consistent with the invention may be used in a wide variety of integrated circuit devices and/or in a wide variety of data processing systems, including in computers, embedded controllers, and other programmable electronic devices. For example, FIG. 11 illustrates an exemplary data processing system 200 which may represent practically any programmable electronic device, and even a development environment for a programmable electronic device. Data processing system 200 includes a system controller 202 interfaced with memory storage such as synchronous dynamic random access memory (SDRAM) 204. A clock oscillator 206 and a Joint Test Automation Group (JTAG) connector 208 (for use in performing device verification and testing) are interfaced with the controller. Moreover, any number of external devices may be interfaced with controller 202, e.g., an RS232 interface 210, a control panel 211, an infrared transceiver 212, a Universal Serial Bus (USB) connector 214, a network connector 216, a IEEE 1394 connector 218 and an LCD display 220, among others. Further external devices may be coupled to the system controller via ASB and PCI slots 221, 222.

Figure 12:
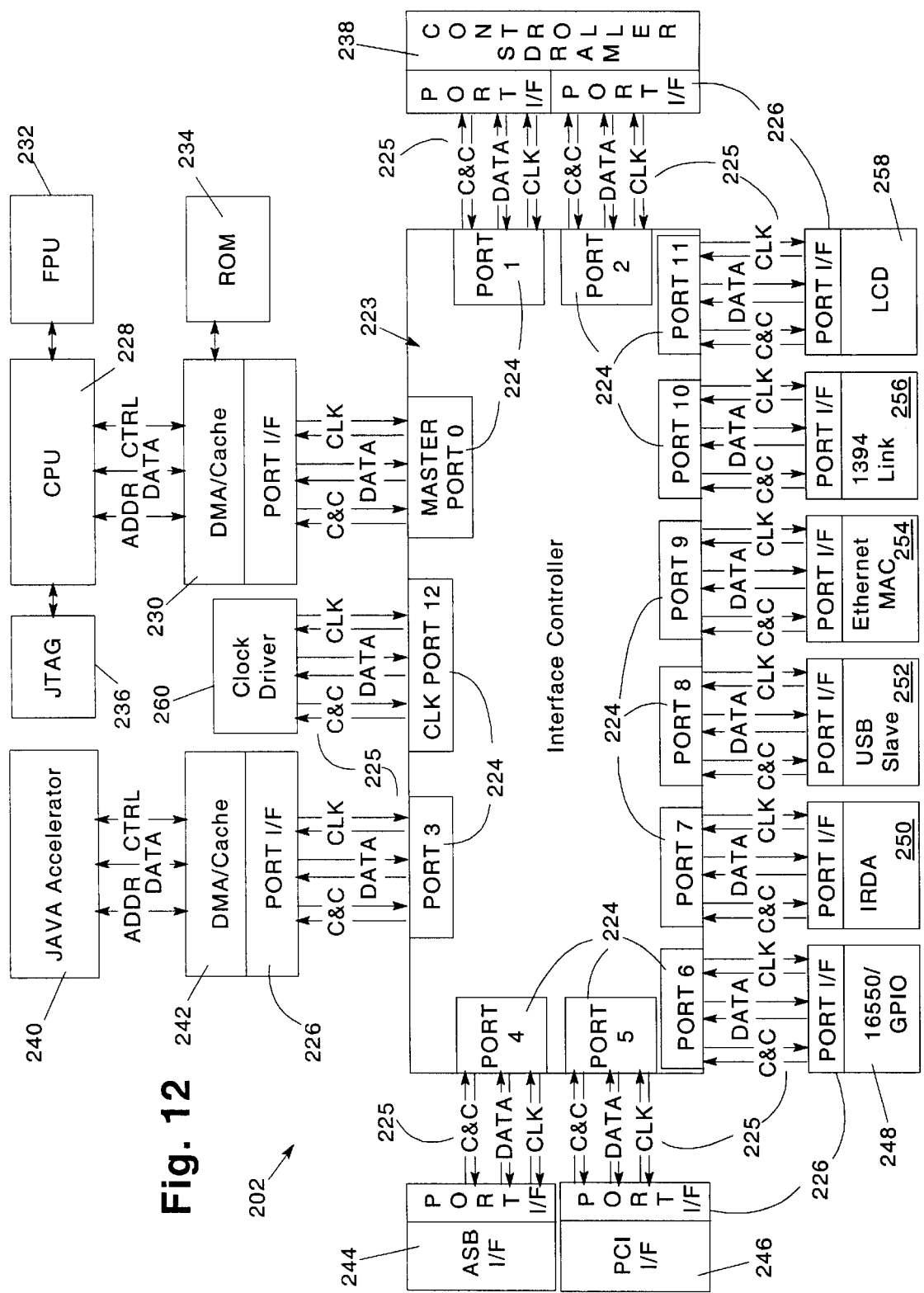
FIG. 12 is a block diagram of the system controller in the development environment data processing system of FIG. 11.

As shown in FIG. 12, system controller 202 may be implemented using a concurrent serial interconnect consistent with the invention, including an interface controller 223 that controls a plurality of serial ports 224 interfaced with a plurality of functional blocks via serial interconnections 225 coupled to port interfaces 226 defined within each functional block. Controller 202 includes a central processing unit (CPU) functional block 228 that functions as the host for the concurrent serial interconnect, interfaced through master port 0 via a DMA/cache block 230 within which a port interface 226 is defined. Additional processing units, e.g., a floating point unit 232, may be interfaced with CPU 228, and other memory devices, e.g., ROM 234 may be interfaced with block 230. Verification and testing may be handled by a JTAG block 236, which is interfaced with JTAG connector 208 (FIG. 11).

Ports 1 and 2 are interconnected with a SDRAM controller functional block 238 including a pair of port interfaces 226. Port 3 is illustrated as interfacing with a JAVA accelerator functional block 240 used to accelerate processing of JAVA-language bytecodes on CPU 228 (described, for example, in U.S. Ser. No. 08/57,430, filed Nov. 27, 1996 by David Ross Evoy). Ports 4 and 5 are interfaced with ASB and PCI interface blocks 244, 246, which are respectively interfaced with ASB and PCI slots 221, 222, respectively (FIG. 11).

Ports 6–11 are respectively interfaced with a 16550/GPIO (General Purpose Input/Output) functional block 248, an infrared interface functional block 250, a USB slave functional block 252, an Ethernet Media Access Control (MAC) functional block 254, a 1394 interface functional block 256 and an LCD driver functional block 258. Each of these functional blocks is interfaced with the appropriate components 210–220 of FIG. 11.

FIG. 13 illustrates another exemplary data processing system, a set top box 300 for use in distributing digital video from a cable television broadcast to a television. Set top box 300 includes a controller 302 interfaced with SDRAM 304. Also interfaced to the controller is a control panel 306, clock oscillator 308, JTAG connector 310, infrared transceiver 312, video out connector 314, 1394 connectors 316, 318, video in connector 320 and alternate video in connector 322.

As shown in FIG. 14, controller 302 is interfaced with the various external components of FIG. 13 via a plurality of functional blocks interfaced via a concurrent serial interconnect consistent with the invention. An interface controller 324 is interfaced with a plurality of serial ports 326, which are in turn interfaced with functional blocks via serial interconnections 328 and port interfaces 330 defined in each of the functional blocks.

A CPU functional block 332 is connected to master port 0 via a DMA/cache block 334, and operates as a host for the concurrent serial interconnect. Additional components, e.g., a FPU block 336 and a ROM 338, may also be interfaced with blocks 332 and 334, respectively. A digital video encoder (DENC) functional block 340 is interfaced with port 1 via a display block 342, and is ultimately connected to the video out connector 314 of FIG. 13. Port 2 is coupled to a central services functional block 344, which interfaces the controller with a number of central services, including components 306–312 of FIG. 13. Ports 3 and 4 are coupled to 1394 link functional blocks 346, 348, which are respectively coupled to connectors 316, 318 (FIG. 13). Ports 5–8 are respectively coupled to MPEG functional block 350, cable transport fuictional block 352, 2D/3D graphics functional block 354 and digital video capture functional block 356. Blocks 352 and 356 are respectively coupled to connectors 320, 322 (FIG. 13).

To design either of the controllers 202, 302 of FIGS. 12, 14, each of the functional blocks required therefor would be assembled together and laid out as appropriate, as is well known in the art. Within each functional block would be an appropriate generic port interface, or in the alternative, custom circuitry may be designed to interface the I/O connections for a functional block with a generic port interface external to the block. Next, a concurrent serial interconnect would be added to the design, including an interface controller with a suitable number of channels and an appropriate number of ports necessary for adequately interconnecting the functional blocks in the design. Then, simply by routing the appropriate serial command/data/clock in/out lines between the ports and the functional blocks, the functional blocks may be interfaced with one another to form the concurrent serial interconnect.

Concurrent serial interconnects consistent with the invention provide a number of unique advantages. First, routing congestion is typically reduced since a reduced number of wired are required to interconnect functional blocks as compared to multi-drop bus interfaces. Second, reusability is improved since the interface is "framed" and the control scheme is encoded. Third, the addition of new system functions, specifically new functional blocks, to a design typically only affects the design of the interface controller, thereby increasing design reuse since older blocks may be used with new blocks with little or no modification. Fourth, testing for data integrity and implementing error correction typically needs only be done for the interface controller since that controller becomes the primary data router for the design. Fifth, by providing the clock between functional blocks, the entire design becomes synchronous even though one or more of the functional blocks operates autonomously of other blocks. Sixth, exceptionally high data to pin count ratios are possible, due to the high transmission rates possible via the interconnect. Moreover, with multiple channels, the overall throughput increases even more.

Various additional modifications may be made to the illustrated embodiments without departing from the spirit and scope of the invention. Therefore, the invention lies in the claims hereinafter appended.

What is claimed is:

1. A circuit arrangement for interfacing a plurality of functional blocks to one another in an integrated circuit device, the circuit arrangement comprising:

(a) a plurality of serial ports, each serial port associated with and coupled to a functional block via a point-to-point connection to permit external communication therewith, and each serial port including separate serial command, data and clock interconnects; and (b) an interface controller, coupled to each of the plurality of serial ports, the interface controller configured to selectively couple at least two of the plurality of serial ports to one another to define a logical communications channel between the functional blocks associated therewith.

2. The circuit arrangement of claim 1, further comprising a plurality of port interfaces, each port interface disposed within and coupled to a functional block to interface the functional block with the serial port associated therewith.

3. The circuit arrangement of claim 1, wherein the serial command and data interconnects for at least one of the serial ports respectively include serial command and data input lines.

4. The circuit arrangement of claim 1, wherein the serial command and data interconnects for at least one of the serial ports respectively include serial command and data output lines.

5. The circuit arrangement of claim 1, wherein, for at least one of the serial ports, the serial command interconnect thereof includes separate serial command input and output lines, and the serial data interconnect thereof includes separate serial data input and output lines.

6. The circuit arrangement of claim 1, wherein, for at least one of the serial ports, the serial clock interconnect thereof includes separate serial clock input and output lines.

7. The circuit arrangement of claim 1, wherein the serial command and data interconnects for at least one of the serial ports are differential interconnects.

8. The circuit arrangement of claim 1, wherein the serial command and data interconnects for at least one of the serial ports are single-ended interconnects.

9. The circuit arrangement of claim 1, wherein the interface controller is configured to selectively couple serial ports to one another responsive to a controller command received from a functional block via the command interconnect of the serial port associated therewith.

10. The circuit arrangement of claim 9, wherein the interface controller is further configured to direct functional block commands between source and target functional blocks via the command interconnects of the serial ports associated therewith to permit the source functional block to control the target functional block.

11. The circuit arrangement of claim 9, wherein the interface controller is further configured to establish the logical communications channel by receiving a channel request received from a requesting serial port, forwarding a channel request to at least one target serial port, receiving a connect response from the target serial port, and forwarding a connect response to the requesting serial port.

12. The circuit arrangement of claim 11, wherein the interface controller is further configured to establish a logical communications channel requested by the requesting serial port only in response to a grant indication in the connect response from the target serial node, and to refuse establishment of a logical communications channel requested by the requesting serial port responsive to a deny indication in the connect response from the target serial node.

13. The circuit arrangement of claim 11, wherein the interface controller is further configured to release at least one serial port from a logical communications channel in response to a channel abort command received from one of the plurality of serial ports.

14. The circuit arrangement of claim 9, wherein the interface controller is configured to selectively preempt a logical communications channel responsive to a channel request received from a requesting serial port having a higher priority than at least one of the serial ports coupled to the logical communications channel.

15. The circuit arrangement of claim 1, wherein the interface controller is further configured to direct an interrupt command between a source and a target functional block to permit the source functional block to preempt a logical communications channel established for the target functional block.

16. The circuit arrangement of claim 1, wherein the interface controller is configured to selectively couple a source serial port to at least two target serial ports to define a broadcast logical communications channel between the functional blocks associated therewith.

17. The circuit arrangement of claim 1, wherein the interface controller is configured to selectively couple at least two of the plurality of serial ports to one another to define a second logical communications channel between the functional blocks associated therewith, the interface controller further configured to concurrently transmit information over the first and second logical communications channels.

18. The circuit arrangement of claim 17, wherein at least one of the serial ports includes serial command and data in lines and serial command and data out lines, and wherein the interface controller is configured to couple the serial command and data in lines to the first logical communications channel, and to couple the serial command and data out lines to the second logical communications channel.

19. The circuit arrangement of claim 1, wherein the interface controller includes a programmable arbitration scheme.

20. The circuit arrangement of claim 19, wherein the interface controller is configured to receive arbitration data defining the arbitration scheme from at least one of the plurality of serial ports.

21. An integrated circuit device comprising the circuit arrangement of claim 1.

22. A data processing system comprising the circuit arrangement of claim 1.

23. A program product, comprising a hardware definition program that defines the circuit arrangement of claim 1; and a signal bearing media bearing the hardware definition program.

24. The program product of claim 23, wherein the signal bearing media includes at least one of a transmission type media and a recordable media.

25. A circuit arrangement for an integrated circuit device, the circuit arrangement comprising:
   (a) a plurality of functional blocks including first and second functional blocks, each functional block including a port interface;
   (b) a plurality of serial ports including first and second serial ports, each serial port coupled to a functional block via a point-to-point connection to the port interface of the associated functional block to permit external communication therewith, and each serial port including a serial command in line, a serial command out line, a serial data in line, a serial data out line, a clock in line, and a clock out line, the first and second serial ports respectively associated with the first and second fuictional blocks; and
   (c) an interface controller, coupled to each of the plurality of serial ports, the interface controller configured to selectively couple the first and second serial ports to one another in response to a controller command received from the first functional block over the command out line of the first serial port to define a logical communications channel between the first and second functional blocks.

26. A method of interfacing a plurality of functional blocks in an integrated circuit device, each functional block associated with and coupled via at least one point-to-point serial interconnect to at least one of a plurality of serial ports under the control of an interface controller, the method comprising:
   (a) establishing a logical communications channel between first and second functional blocks from the plurality of functional blocks by transmitting a command from the first functional block to the interface controller through a first serial port among the plurality of serial ports that is associated with the first functional block; and
   (b) communicating data between the first and second functional blocks by transmitting the data between the first serial port and a second serial port among the plurality of serial ports that is associated with the second functional block.

27. The method of claim 26, wherein each serial interconnect includes separate serial command and data lines.

28. The method of claim 26, wherein communicating data between the first and second functional blocks includes directing functional block commands between the first and second functional blocks over the logical communications channel.

29. The method of claim 26, establishing the logical communications channel includes:
   (a) transmitting a channel request command from the first functional block to the interface controller;
   (b) transmitting a channel request command from the interface controller to the second functional block;
   (c) transmitting a connect response from the second functional block to the interface controller; and
   (d) transmitting a connect response from the interface controller to the first functional block.

30. The method of claim 29, wherein establishing the logical communications channel further includes determining whether the connect response from the second functional block includes a grant indication.

31. The method of claim 30, further comprising:
   (a) transmitting a channel request command from a requesting functional block among the plurality of functional blocks, the channel request command indicating a target functional block among the plurality of functional blocks with which a second logical communications channel is requested;
   (b) transmitting a connect response from the target functional block, the connect response including a deny indication; and
   (c) refusing establishment of the second logical communications channel responsive to the deny indication in the connect response.

32. The method of claim 29, further comprising releasing at least one of the first and second functional blocks from the logical communications channel in response to a channel abort command received from one of the plurality of functional blocks.

33. The method of claim 29, further comprising selectively preempting the logical communications channel responsive to a channel request command received from a third functional block having a higher priority than at least one of the first and second functional blocks.

34. The method of claim 26, further comprising:
(a) directing an interrupt command from a third functional block to the second functional block; and
(b) selectively preempting the logical communications channel based upon a priority scheme in the second functional block.

35. The method of claim 34, wherein selectively preempting the logical communications channel includes:
(a) releasing the first logical communications channel between the first and second functional blocks; and
(b) establishing a second logical communications channel between the second and third functional blocks by transmitting a command from the second functional block to the interface controller.

36. The method of claim 26, wherein establishing the logical communications channel further includes coupling a third functional block to the logical communications channel.

37. The method of claim 26, further comprising:
(a) establishing a second logical communications channel between at least two of the plurality of functional blocks; and
(b) communicating data over the second logical communications channel concurrently with communicating data over the first logical communications channel.

38. The method of claim 26, further comprising programming the interface controller with an arbitration scheme.

39. The method of claim 38, wherein programming the interface controller includes receiving arbitration data defining the arbitration scheme from at least one of the plurality of functional blocks.

40. A method of designing an integrated circuit device, the method comprising:
(a) assembling together into a circuit arrangement a plurality of predefined functional blocks, each predefined functional block including a port interface;
(b) adding a serial interconnect to the circuit arrangement, the serial interconnect including a plurality of serial ports controlled by an interface controller, each serial port including separate serial command, data and clock interconnects; and
(c) associating each functional block with at least one of the plurality of serial ports by respectively routing serial command, data and clock wires between the port interface of the functional block and the serial command, data and clock interconnects of the serial port.

* * * * *